United States Patent [19]
Cook

[11] Patent Number: 5,607,274
[45] Date of Patent: Mar. 4, 1997

[54] BALE HANDLING APPARATUS AND PROCESS

[75] Inventor: Ivan J. Cook, Rt. 1, Box 1961, Hermiston, Oreg. 97838

[73] Assignee: Ivan J. Cook, Hermiston, Oreg.

[21] Appl. No.: 356,875

[22] Filed: Dec. 15, 1994

[51] Int. Cl.⁶ .................................................. B65G 57/32
[52] U.S. Cl. ........................... 414/111; 414/478; 414/482
[58] Field of Search .................................. 414/24.5, 111, 414/132, 469, 470, 471, 474, 478, 482, 786

[56] References Cited

U.S. PATENT DOCUMENTS

| | | |
|---|---|---|
| 3,877,595 | 4/1975 | Edelman . |
| 3,880,305 | 4/1975 | Van Polen . |
| 4,002,242 | 1/1977 | Eriksson .................................. 414/471 |
| 4,044,963 | 8/1977 | Hostetler . |
| 4,082,192 | 4/1978 | Cox . |
| 4,084,708 | 4/1978 | Goodvin . |
| 4,103,831 | 8/1978 | Laudemann . |
| 4,148,399 | 4/1979 | Carter . |
| 4,564,325 | 1/1986 | Ackerman . |
| 4,578,008 | 3/1986 | Gleason . |
| 4,687,402 | 8/1987 | Zatylny . |
| 4,952,111 | 8/1990 | Collahan .................................. 414/111 |
| 4,971,504 | 11/1990 | Klompien .................................. 414/111 |
| 5,316,431 | 5/1994 | Barber ...................................... 414/111 |
| 5,320,472 | 6/1994 | Matlack et al. ........................ 414/111 |
| 5,333,981 | 8/1994 | Pronovost et al. ...................... 414/111 |
| 5,397,208 | 3/1995 | Siebenga ................................. 414/111 |
| 5,405,229 | 4/1995 | Tilley et al. ............................ 414/111 |

FOREIGN PATENT DOCUMENTS

| | | | |
|---|---|---|---|
| 3933834 | 4/1991 | Germany .................................. 414/111 |
| 2011346 | 7/1979 | United Kingdom .................... 414/111 |

OTHER PUBLICATIONS

Mountain View Equipment Company: "MVE 8000" Self-Propelled Big Bale Wagon (Brochure Attached), Date Unknown.

J. A. Freeman & Son, Inc.: "Model 5000" Big Bale Roadsider (Brochure Attached), Date Unknown.

*Primary Examiner*—Karen B. Merritt
*Assistant Examiner*—Gregory A. Morse
*Attorney, Agent, or Firm*—Wells, St. John, Roberts, Gregory & Mrtkin, P.S.

[57] ABSTRACT

A process and apparatus to pickup, stack and transport bales and other boxed or contained commodities. The invention is a flat bed vehicle and process which utilize a boom mounted on a vehicle which allow the vehicle to arrange itself adjacent the object to be picked up, lower the boom to attach to the object and to then raise and rotate it to a position where it can be lowered onto the flat bed portion of the vehicle. The invention further provides for the arrangement of the bales or other objects such that when the flat bed is tilted to a substantially vertical position and moved away, the bales or boxes that were arranged horizontally on the flatbed are stacked vertically.

9 Claims, 3 Drawing Sheets

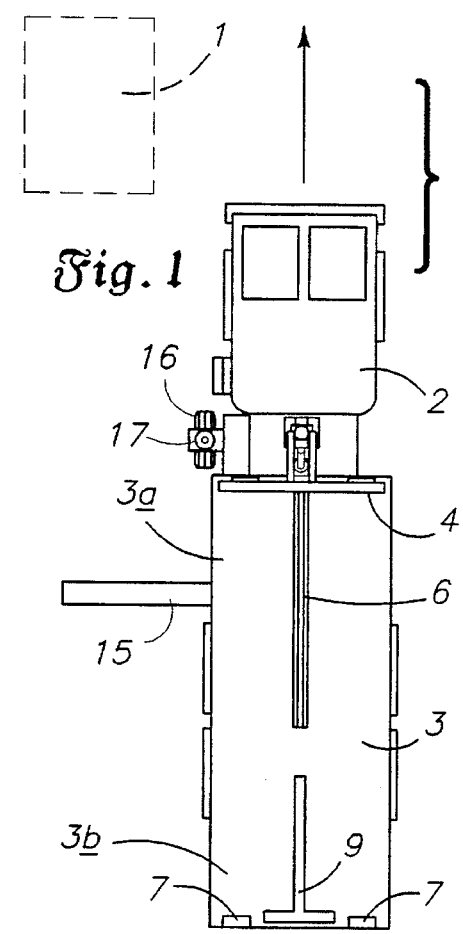
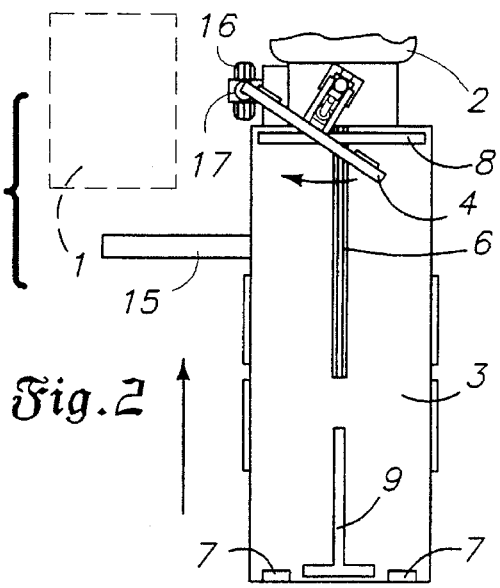
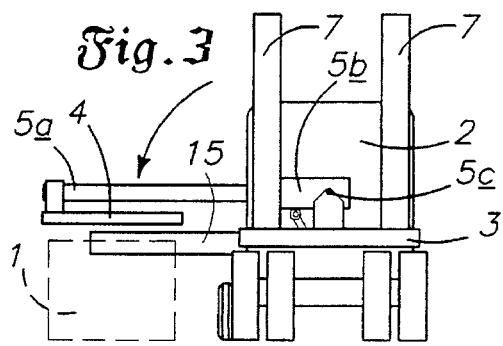
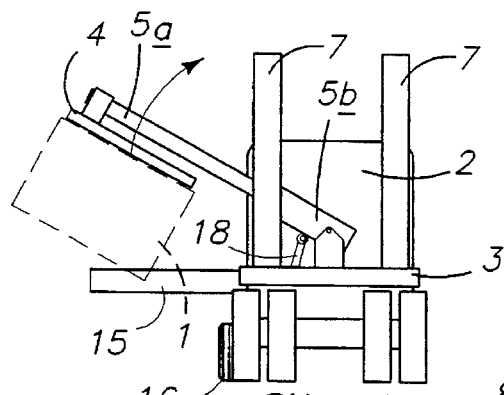
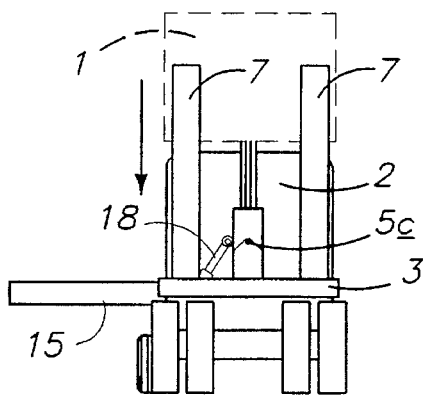
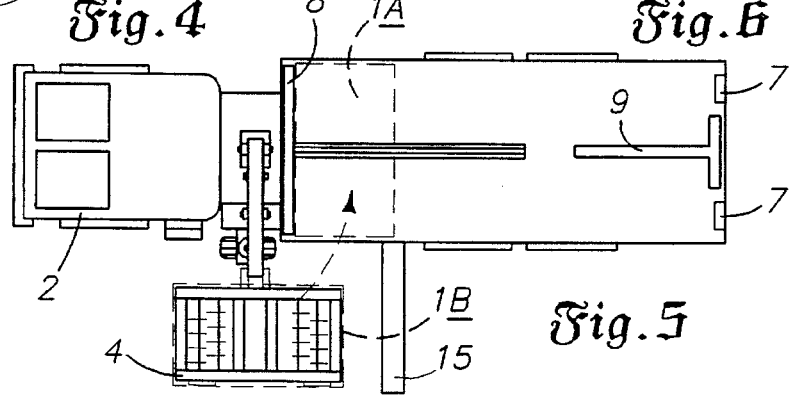

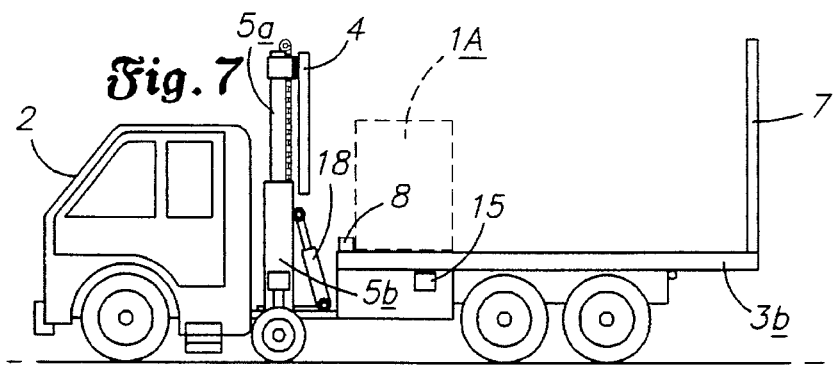
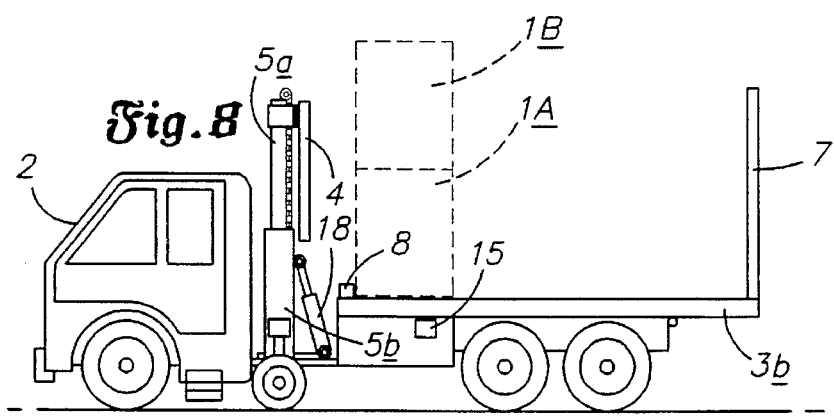
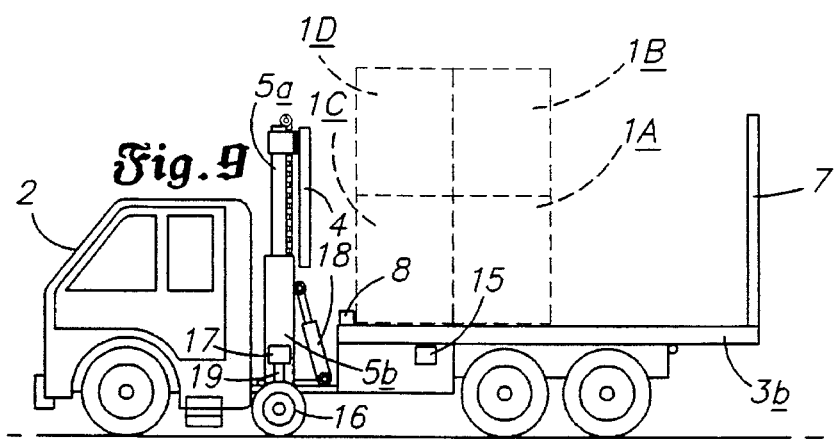
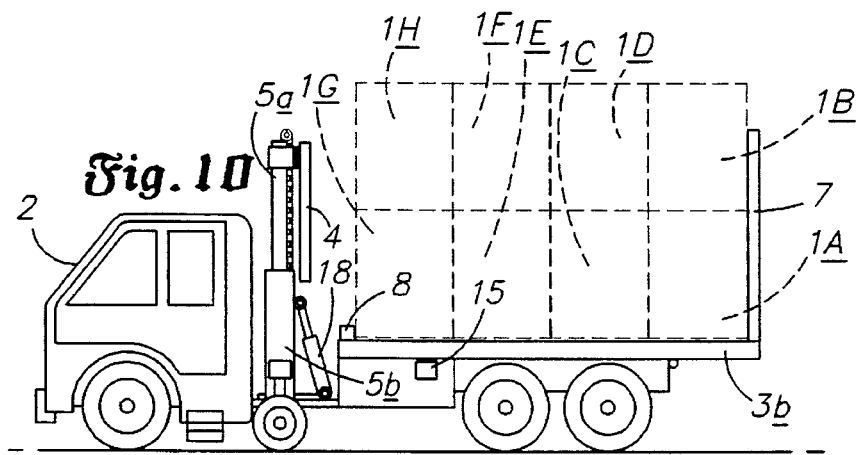

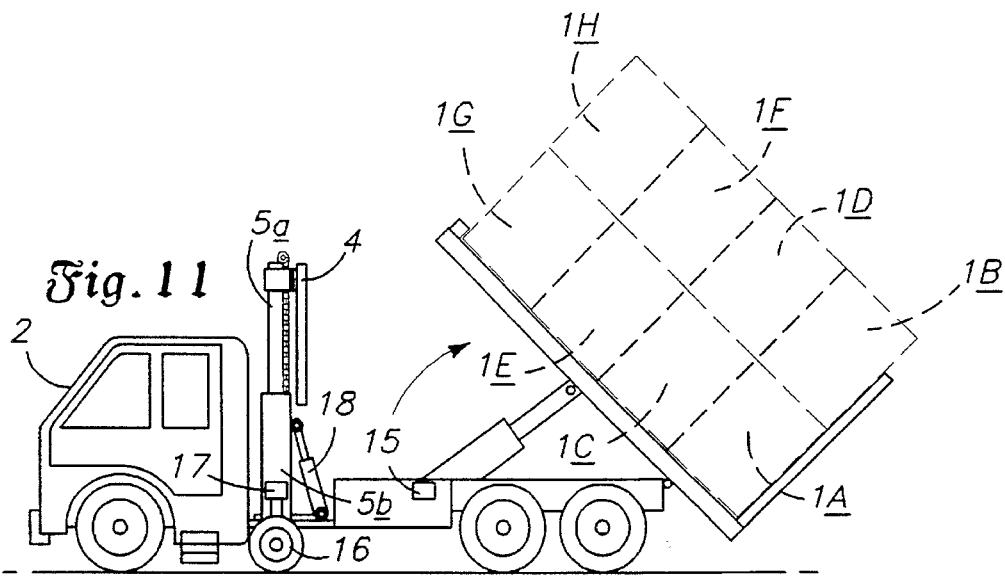
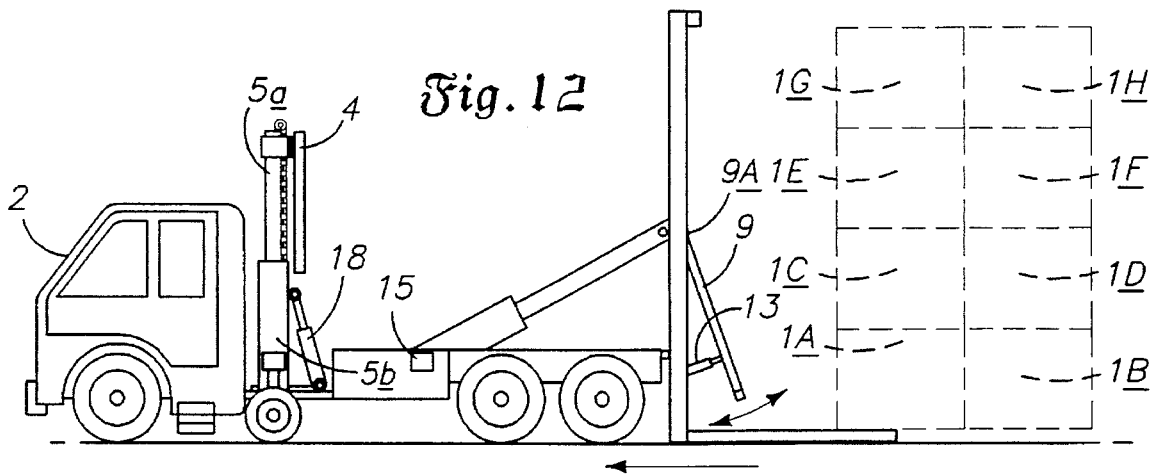
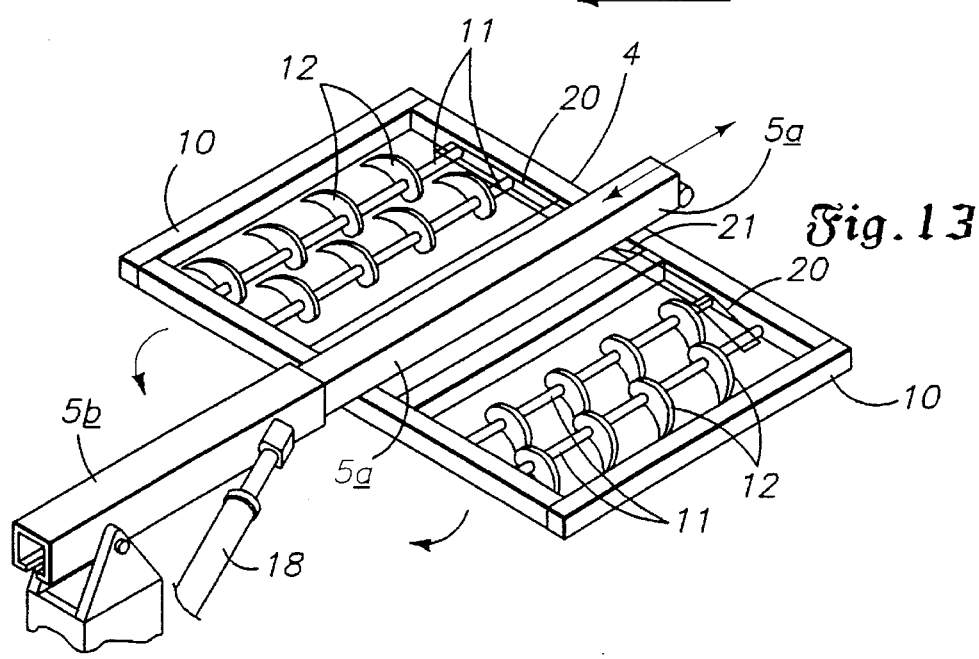

BALE HANDLING APPARATUS AND PROCESS

FIELD OF THE INVENTION

This invention generally pertains to farm equipment and describes an apparatus and a process which may be used for the handling, stacking and transportation of large bales of hay and various types of large containers.

BACKGROUND OF THE INVENTION

For large producers of hay in arid climates, it is more economical to bale the hay in large cylindrical and/or rectangular shaped bales than smaller tradionally sized bales. The large rectangular bales typically weigh approximately eighteen hundred (1800) pounds and have dimensions of approximately four (4) feet by four (4) feet by eight (8) feet. The bales can also be approximately three (3) feet by four (4) feet by eight (8) feet.

A current problem is how to handle, transport, stack and store these large bales. The current handlers and transporters for large rectangular shaped bales are specially built and dedicated vehicles which can generally only be used to pick up and stack hay bales and since they do not perform any other functions, they are not as economical as if they could be used for other trucking functions. Examples of existing transporters are: the "Model 5000 Big Bale Roadsider", which is manufactured and marketed by J. A. Freeman & Sons, Inc.; and the MVE 8000 Self Propelled Big Bale Wagon, manufactured by Mountain View Equipment Company.

The existing transporters are generally manufactured by starting with a standard truck/vehicle chassis, building a cab which only spans part of the width of the vehicle so that the vehicle can receive bales from the front of the vehicle as it drives through a hayed field. Substantial other modifications are made to the chassis and equipment is added which only has one application, i.e. large hay bales. Operationally, these existing handlers drive through a field of baled hay and load the hay from the front of the vehicle, using either: a track and ramp system to engage the bale and pull it up the ramp to the storage area; or else using a clamp type arm which extends to the front of the vehicle and which engages the bale by surrounding and then squeezing the bale and lifting it to load it onto the flat bed portion of the vehicle.

Because the existing bale handlers and transporters require substantial modification or additions to an existing chassis and therefore become dedicated to one use, i.e. bale loading and transporting, they are unnecessarily expensive, cost prohibitive and have no versatility.

This invention solves the forenamed problems by providing a large bale handler and transporter which can easily and relatively inexpensively be placed on existing general use flat bed vehicles. In solving the forenamed problems and others, this invention utilizes a boom and a bale attachment mechanism which are used to pick up, transport and stack large bales of hay without the need to substantially modify an existing vehicle and without the need to dedicate the modified vehicle to one use, i.e. large bale handling and transporting.

This invention is versatile in that it can be used to pickup, stack and transport other commodities, such as large crates of produce and other goods, and because the truck can interchangeably be used as a general use flatbed truck. The bed portion of this invention can also be fitted with side walls and used for bulk carrying of produce or other products.

This invention can accomplish the bale loading function while continuously moving, thereby substantially reducing the time required to load the hay and the therefore reduce the time the hay must lay in the field before being transported.

This invention solves the forenamed problems in such a way that the handling and transporting of hay is accomplished efficiently, economically and expeditiously.

SUMMARY OF THE INVENTION

This invention generally pertains to an apparatus and process which provides a large bale handler, stacker and transporter, and more particularly provides a versatile large bale transporter which picks up and stacks large hay bales while continuously moving and not requiring a complete stop. This invention further includes a rotatable lifting and stacking boom and a mechanism for the boom to attach to and lift the large bale and place it on the flatbed portion of the vehicle, with the capacity to accommodate several bales.

It is an object of this invention to provide a large hay bale handler and transporter which can be manufactured much more economically than those currently being used. This invention accomplishes this by utilizing a boom arrangement which can readily be attached and adapted to existing vehicles, thereby eliminating the costs inherent in substantially modifying existing vehicles and dedicating the vehicle to use only for large bale handling and transportation.

It is an object of this invention to provide a large hay bale hander which can be used without the need to make substantial modifications to available existing chassis and one which can easily be placed on existing vehicles, resulting in versatile vehicles which can be used for many other tasks and uses, such as large container lifting, stacking and transportation as well as bulk produce/product transportation. This invention accomplishes this purpose by utilizing the boom arrangement discussed above.

It is an object of this invention to provide a large hay bale handler and transporter which operates efficiently and expeditiously in the handling, transporting and stacking of hay bales. This invention accomplishes this purpose by providing a vehicle and boom arrangement which allows a high capacity vehicle to be driven through the field, and while moving it can easily load, stack and re-arrange the hay bales, and then unload and stack the bales expeditiously.

It is also an object of this invention to provide a large hay bale handler which can also be used as a flatbed truck and which meets the dimensional requirements such that it can also be used on the road as a truck.

Other objects, features and advantages of this invention will appear from the specification, claims and accompanying drawings which form a part hereof. In carrying out the objects of this invention, it is to be understood that its essential features are susceptible to change in design and structural arrangement with only one preferred embodiment being illustrated in the accompanying drawings, as required.

BRIEF DESCRIPTION OF DRAWINGS

In the accompanying drawings which form a part hereof:

FIG. 1 is a top view of one example of the invention on a vehicle;

FIG. 2 is a top view of one example of the invention on a vehicle and showing the rotational movement of the boom;

FIG. 3 is a rear view of one example of the invention and showing movement of the boom in a downward direction to engage a large hay bale;

FIG. 4 is a rear view of one example of the invention and showing attachment to a large hay bale and the return movement of the boom in an upward direction;

FIG. 5 is a top view of one example of the invention and showing the boom in a downward position, where it engages and attaches to a large hay bale;

FIG. 6 is a rear view of one example of the invention and showing the boom with a large hay bale attached and in a position to lower the bale for stacking and arrangement;

FIG. 7 is a side view of one example of the invention and showing the vehicle with only one large hay bale thereon;

FIG. 8 is a side view of one example of the invention and showing the vehicle with a second large hay bale thereon and showing how the second bale is stacked on the first;

FIG. 9 is a side view of one example of the invention and showing the vehicle with an arrangement of four large hay bales thereon;

FIG. 10 is a side view of one example of the invention and showing the vehicle with an arrangement of eight large hay bales thereon;

FIG. 11 is a side view of one example of the invention and showing the bed portion of the vehicle tilting backwards to unload and stack the bales;

FIG. 12 is a side view of one example of the invention and showing the bed portion of the vehicle tilted all the way back with the bales unloaded and the vehicle moving away from the stack of unloaded hay bales; and FIG. 13 is a perspective view of one example of a bale attachment mechanism on the boom.

DESCRIPTION OF THE PREFERRED EMBODIMENT

This invention generally pertains to a process and apparatus to pickup, stack and transport bales and other boxed or contained commodities. The invention utilizes a boom mounted on a vehicle which allows the vehicle to position itself adjacent to the object to be picked up, such that when the boom is in its downward position, the bale attachment mechanism can attach to the object and to then raise and rotate the object to a position where it can then be lowered onto the flat bed portion of the vehicle. The invention further provides for the arrangement of the bales or other objects such that when the flat bed is tilted to a substantially vertical position and then moves away from the stack, the bales or boxes that were arranged horizontally on the flatbed are stacked vertically.

The various components shown or described herein for any specific application of this invention can be varied or altered as anticipated by this invention. This invention comprises a unique combination of elements, each element of which can be accomplished by one of several different means or variations for a specific application of this invention. The practice of a specific application of any element or of any fastening and connection means or other components, such as hydraulic components, may already be widely known or used in the art or by persons skilled in the art or science and each will not therefore be discussed in significant detail.

For purposes of this detailed description and defining and labeling different components of this invention, this invention can be used to transport not only bales, but also can be used for any similarly shaped and sized objects, such as boxes, containers or other contained, baled or wrapped material. However for ease in labeling and description, "bale", as used herein, shall be defined to include not only hay and other bales, but also large containers and other large objects.

The vehicle and vehicle cab 2 used in conjunction with this invention can be one of a number of different types and makes of vehicle, with none in particular being required to practice the invention. The vehicle generally needs to have a chassis, a drive train and a flat bed 3 to hold bales as they are retrieved.

The flatbed 3 portion of the vehicle can also be any one of a number of different types of flatbeds or platforms, so long as it can hold large bales or other containers and allow them to be pushed to the rearward end 3b of the flatbed 3. There is a corresponding frontward end 3a of the flatbed 3 portion of the vehicle and the flatbed 3 must be tiltable such the front end 3a is raised to allow loading and unloading from the rearward end 3b, as shown in FIG. 11.

The boom 5, with an upper boom section 5a and a lower boom section 5b, can be rotatably mounted to the vehicle in one of any number of different ways, preferably to the frame or to the chassis of the vehicle, or any other part for that matter so long as it can perform the functions stated herein. The boom 5 is rotatably mounted on the vehicle by known means such that it can rotate about its vertical axis.

The boom 5 includes a pivot joint 5c, as shown in FIG. 6, which allows the upper boom end 5a to be lowered by known means such as by a hydraulic cylinder 18, to a position such that the bale attachment mechanism 4 can engage the bale 1, as illustrated in FIGS. 3 and 4, among others.

The bale attachment mechanism 4 can be practiced in any one of a number of ways, generally performing the functions of attaching to the bale, movement up and down the boom and detaching from the bale once the bale is in the desired location on the flatbed 3.

The bale attachment mechanism 4 is operatively connected to the boom 5 by a guide surrounding the boom 5 and moves relative thereto by known chain drive means, such as those typically found on forklifts. There are numerous other means to accomplish the same relation and interaction between the bale attachment mechanism and the boom 5, with no particular one being required to practice this invention.

When the vehicle is driving through a field to pickup hay bales, the bale attachment mechanism can be lowered to the ready position and rested in a small cradle which can be mounted on stabilization frame 17, a position shown in FIG. 3.

The example of a bale attachment mechanism illustrated in the drawings, more particularly in FIG. 13, includes a frame 10, drive rods 11 and grapple forks 12. To engage the bale 1, the drive rods 11 are rotated, thereby causing the grapple forks 12 to engage the bale and securely attach to it.

FIG. 13 shows the particular means by which the drive rods 11 are caused to rotate such that the grapple forks 12 can engage the bale in this application of the invention, providing a hydraulic cylinder means 21 which applies force on linkage mechanism 20, which is attached to drive rods 11. When the linkage mechanism 20 receives a force from the hydraulic cylinder means 21, it causes the drive rods 11 to rotate, which in turn causes the grapple forks 12 to rotate into and engage the bale. The release of the bale occurs in a similar way, but reversed.

When lifting the large bales it is preferable to use some means to support the lifting forces and reduce the twisting forces on the frame of the vehicle and a vehicle stabilizer mounted near the boom 5 can accomplish this by providing additional bracing support and stabilization of the vehicle while lifting the bale 1. The vehicle stabilizer is securely attached to the frame of the vehicle and maintains contact with the ground while the bale is being lifted. FIG. 1 shows a vehicle stabilizer which includes a stabilization frame 17 which is attached to the frame of the vehicle and a wheel 16 which is operatively connected to the stabilization frame 17 by stabilizer axis 19 such that the mounted tire 16 can freely rotate about its vertical axis as facilitated by the stabilizer axis 19 and its free rotation within the stabilization frame 17.

The configuration of the wheel 16 rotatably mounted in the stabilization frame 17 by stabilizer axis 19 is sometimes referred to as a "crazy wheel" because it tends to rotate to follow the direction of the vehicle.

It is preferable that the wheel 16 can be raised from the ground when vehicle stabilization is not required for the vehicle, such as for highway use of the vehicle, and this can be accomplished by several known means, one of which is by allowing for the stabilization axis to slide vertically within its mount on the frame and through the use of a hydraulic cylinder which raises and lowers the wheel as desired.

FIG. 1 further shows a bale engagement arm 15 extended from the side of the vehicle where the bales 1 are being lifted. The bale engagement arm 15 in FIG. 1 is shown in its outwardly extended position in FIG. 1, which is approximately three feet out from the side of the flatbed 3. The bale engagement arm 15 can also be retracted by known hydraulic means such that it does not extend outwardly beyond the side of the flatbed 3, thereby enabling the vehicle to meet highway usage dimensional standards.

While the vehicle is traveling through a field picking up bales for example, the bale engagement arm is outwardly extended to a position from the side of the vehicle approximately three feet and serves to engage the bale while the vehicle is moving and abut against and push the bale 1 along side the vehicle at the same speed of the vehicle until the bale attachment mechanism 4 can attach to and lift the bale 1.

The bale containment apparatus can be accomplished in one of several ways, but generally performs the function of retaining the load on the flatbed during transportation and while the flatbed is being tilted. The two forks 7 are substantially vertically oriented when the flatbed 3 is substantially horizontal and as shown in FIGS. 2 & 6, among others, is very similar to the forks on a forklift truck.

The pushbar is a means to move bales from the frontward end 3a of the flatbed to the rearward end 3b of the flatbed, and, as shown in FIGS. 2 and 7, is a pushbar 8, which can be a bar, channel or other device. The pushbar 8 is connected to its own hydraulic drive system which moves it and consequently the bales from the frontward end 3a of the flatbed approximately the distance of the width of the bale to allow room for the next bale to be placed on the flatbed. Then when the next bales are loaded onto the flatbed and pushed back, they in turn push the first set of bales and so on, as further illustrated in FIGS. 7–10. There are many known means for accomplishing the pushbar, none in particular being required to practice the invention.

The push away mechanism is comprised of a pushram 9 whose source of pushing power is from a hydraulic cylinder 13 shown in FIG. 12. Several known specific means to accomplish the push away mechanism are generally known hydraulically and otherwise, with no particular way required to practice this invention.

FIG. 1 shows a top view of one example of how the invention can be practiced, illustrating a typical cab 2 of the vehicle, the flatbed 3, the forks 7 comprising the bale containment apparatus, a top view of the bale attachment mechanism 4 and the push ram 9. The vehicle is shown approaching a large bale 1 to be picked up and stacked.

FIG. 2 shows the same general top view as FIG. 1, except it further illustrates the boom attachment mechanism 4 partially rotated. When fully rotated to a position ninety degrees clockwise in FIG. 2, it is in a position such that the boom attachment mechanism can be lowered to a position where it can engage the large hay bale 1, as shown in FIG. 3.

FIG. 3 is a rear view showing the boom attachment mechanism 4 partially lowered downward. When fully lowered, the boom attachment mechanism 4 is in position to engage the bale 1.

FIG. 4 is another rear view showing the boom attachment mechanism partially raised after engaging and attaching itself to the large hay bale 1.

FIG. 5 is a top view of the vehicle when the boom attachment mechanism 4 is in the approximate position wherein it engages and attaches to a second large hay bale 1B. FIG. 5 also shows that one large hay bale 1A has already been placed on the flat bed 3 of the vehicle.

FIG. 6 is a rear view wherein the boom attachment mechanism 4 has attached itself to a large hay bale 1, been raised back to the vertical position and rotated ninety degrees counter clockwise in FIG. 6, which places it in a position to lower the large hay bale 1 to the flat bed 3 and then to dis-attach itself from the bale.

FIGS. 7 through 10 show the successive configurations of the vehicle as it is loaded, starting with one bale in FIG. 7 and resulting in eight bales in FIG. 10.

FIG. 7 shows a side view of one example of the invention and illustrates the vehicle with only one large hay bale 1 thereon. The forks 7 comprising the bale containment apparatus are also shown.

FIG. 8 also shows a side view of one example of the invention and illustrates the vehicle with two large hay bales 1A & 1B, the second large hay bale 1B being stacked on the first 1A.

FIG. 9 illustrates the configuration of the vehicle with four large hay bales thereon, 1A, 1B, 1C & 1D, in the order they were loaded.

Finally, FIG. 10 shows the configuration with eight large hay bales, 1A, 1B, 1C, 1D, 1E, 1F, 1G & 1H, in the order they were loaded. In the example configuration shown, the vehicle is fully loaded with eight large hay bales and ready to have the large hay bales unloaded.

FIGS. 7–10 further illustrate that the bale attachment mechanism 4 is raised and lowered on the boom by known chain drive means such as those commonly used to raise and lower the forks on a typical forklift.

FIG. 11 shows the fully loaded example configuration and illustrates the tilting of the flat bed 3 during the unloading process. The tilting of the flat bed 3 is accomplished by known hydraulic means.

FIG. 12 shows the eight large hay bales unloaded and stacked and further shows the vehicle moving away from the stack. Although moving the vehicle away from the stack can be accomplished by merely driving the vehicle forward, it is preferable to utilize a push ram 9. The push ram 9 is merely a solid member of any configuration which rotates about its axis at 9A as shown in FIG. 12 and in which known hydraulic means are used to exert force on the push ram 9 toward the stack such that the vehicle is pushed away from the stack more easily than merely driving away.

FIG. 13 is a perspective view of part of the boom attachment mechanism 4, and shows in more detail one example of what how to accomplish this part of the invention. The frame 10 is attached to the upper boom end 5a such that it can be moved back and forth along the longitudinal axis of the boom 5, which can be accomplished by any one of several different known means.

The claws 12 are attached to rods 11 such that when the rods 11 are rotated, the claws 12 rotate and thereby penetrate into the hay bale, providing sufficient adhesion such that the bale can be lifted, rotated and otherwise maneuvered while remaining attached to the frame 10.

In the bale application of this invention, the vehicle is driven through a field with hay or other bales located at spaced points therein. While the vehicle is moving the boom 3 is placed in its downward position and can be rested in a cradle atop the stabilization frame 17, with the bale attachment mechanism 4 positioned at the upper boom end 5a, the wheel 16 of the vehicle stabilization frame 17 is extended downward from the side of the vehicle such that it is in contact with the ground.

When the vehicle reaches the bale 1, the bale engagement arm 15 engages the bale 1 and begins to push it through the field, thus eliminating the need for the vehicle to stop. Once the bale 1 is engaged and being pushed, the upper boom end 5b is further lowered and the bale attachment mechanism 4 engages and attaches to the bale 1. The upper boom end 5b is then raised to a position such that the boom 5 substantially vertical.

The boom 5 is then rotated about its longitudinal axis approximately ninety degrees to a position where when the bale attachment mechanism 4, and consequently the bale 1 are lowered down the boom 5, the bale 1 is placed on the flatbed 3 portion of the vehicle. The upper boom end 5b is then raised back to a substantially vertical position, rotated back about its longitudinal axis approximately ninety degrees and then re-lowered to the ready position to engage the next bale.

If the above-described procedure is followed again for a second bale, the second bale 1B can be lowered such that it is placed on top of the first bale 1A, as shown in FIG. 8. The sequence and process of loading the vehicle with bales such that they are stocked two high is shown in FIGS. 7 through 10.

The bales are moved from the frontward end of the flatbed 3a toward the rearward end of the flatbed 3b utilizing a pushbar 8, as shown in FIG. 2, and FIGS. 7 through 10. The pushbar 8 can be a channel or any other means with a surface which can be utilized to push the adjacent bale toward the rearward end of the flatbed 3b the approximate depth of one bale, and can be moved by known hydraulic means.

Once the flatbed 3 is loaded to the extent desired, the frontward end of the flatbed 3a is tilted upward until the flatbed 3 is substantially vertical, with the bales retained in position by a bale containment apparatus. The bale containment apparatus can be accomplished by several different known means, and FIGS. 1 and 4 show two forks 7 which are substantially perpendicular to the flatbed 3 surface.

Once the flatbed 3 is tilted to substantially vertical, the two forks 7 are beneath the weight of the stocked bales. In order to make it easier for the vehicle to pull away from the bales, a pushaway means or pushram can be utilized. An example of one way to accomplish the function of pushing away from the stack is shown in FIG. 12 wherein a pushaway ram 9 can be utilized and the push force for the pushaway ram 9 can be achieved from known hydraulic cylinder means 13.

When not being utilized and when the flatbed 3 is in its normal horizontal position, the pushaway ram 9 can reside beneath the flatbed 3, with openings in the flatbed 3 to provide a pathway for the pushaway ram 9 to travel to push the vehicle away from the stacked bales.

After pushing away from the stacked bales, the flatbed 3 can be placed back into its horizontal position and ready to pick up additional bales.

This invention can also be practiced without stacking the bales two-high, but instead only placing a lower row on the flatbed before unloading.

This invention can also be used in the reverse order of pickup a stack of bales and transport them, by raising the flatbed 3 substantially vertical position with the forks 7 substantially horizontal and on the ground. The vehicle can then be backed up to a stack of bales, causing the forks 7 to slide under the stack of bales. Then the flatbed 3 can be tilted back to a horizontal position and the stack of bales is thereby loaded onto the flatbed 3 for transportation.

While the drawings depict the bales being picked up on the drivers side of the vehicle, that is for illustration purposes only and the bales can also be picked up on the passenger side of the vehicle, which is the preferable side.

While the preferred embodiment for the invention has been described in detail, those familiar with the art to which this invention relates will recognize various alternative designs and embodiments for carrying out the invention, as defined by the claims which follow.

The invention claimed is:

1. A bale pickup and transport apparatus comprising:
   a. a vehicle with a flat bed;
   b. a boom mounted to the vehicle such that it rotates about a vertical axis and rotates about a horizontal axis;
   c. a bale attachment mechanism, which is attachable and detachable to a bale, and which is operatively attached to the boom such that it can move parallel to the longitudinal axis of the boom;

such that the rotation of the boom about the horizontal axis is capable of moving the bale attachment mechanism from a position alongside the flatbed to a position above the flatbed wherein the boom is substantially vertical, and movement of the bale attachment mechanism parallel to the longitudinal axis of the boom is capable of moving the bale attachment mechanism from the position above the flatbed to a position closely adjacent to the flatbed.

2. A bale pickup and transport apparatus as recited in claim 1 wherein:
   a. the flat bed on the vehicle can be tilted to a substantially vertical position;
   b. the flat bed includes a bale containment apparatus at one end such that when the flat bed is tilted, the bales contained thereon do not slide off the flat bed;

such that when the flat bed is tilted to a substantially vertical position, bales which were horizontally adjacent to one another become stacked on one another.

3. A bale pickup and transport apparatus as recited in claim 2 wherein the flat bed further comprises a pushram such that when the flatbed is substantially vertical, the vehicle can push the bale containment apparatus from under bales which have been stacked and thereby push the vehicle away from the bales.

4. A bale pickup and transport apparatus as recited in claim 1 which further comprises a vehicle stabilizer attached to said vehicle which provides support to the vehicle while the boom is lifting the bales.

5. A bale pickup and transport apparatus as recited in claim 4 and in which the vehicle stabilizer further comprises a vehicle stabilization frame and a wheel operatively connected to said vehicle stabilization frame by a vertical support such that the wheel can freely rotate about the longitudinal axis of the vertical stabilization frame.

6. A bale pickup and transport apparatus as recited in claim 1 wherein the bale attachment mechanism is further comprised of:

a. a frame; and b. a plurality of drive rods mounted on the frame;

c. a plurality of grapple forks, each mounted on the respective drive rods such that when the drive rods are rotated relative to the frame, the grapple forks also rotate and thereby penetrate and attach to the bale.

7. A process for the pickup and transportation of bales, comprising the following steps:

a. positioning a vehicle with a flat bed in a position such that a bale transverse to the flat bed of the vehicle;

b. rotating a boom attached to the flat bed vehicle about a horizontal axis and downward to a position which enables a bale attachment mechanism on the boom to attach to the bale;

c. attaching the bale attachment mechanism to the bale;

d. rotating the boom about the horizontal axis and upward, and rotating the boom approximately ninety degrees about a vertical axis to a position which enables the bale to be lowered onto the flat bed of the vehicle;

e. lowering the bale attachment mechanism along the longitudinal axis of the boom; and f. detaching the bale from the bale attachment mechanism for placement on the flat bed.

8. A process for the pickup and transportation of a plurality of bales as recited in claim 7, and which comprises the following additional steps:

a. pushing each bale on the flat bed toward a rearward end of the flat bed which includes a bale containment apparatus, with each bale in turn pushing the bale that preceded it, thereby loading the flat bed with bales;

b. once the flatbed is loaded with bales at a desired level, tilting the flatbed to a substantially vertical position, thereby creating a stack of bales vertically arranged; and c. moving the flatbed vehicle away from the stack of bales.

9. A process for the pickup and transportation of a plurality of bales as recited in claim 8, and which further comprises the step of stacking one bale on top of the bale that preceded it before the preceding bale is pushed toward the rearward end of the flatbed, thereby enabling two bales to be pushed to the rearward end of the flatbed and stacking to occur.

* * * * *